Sept. 22, 1925.  1,554,360
C. A. MASSING
SKILLET
Filed Feb. 16, 1925
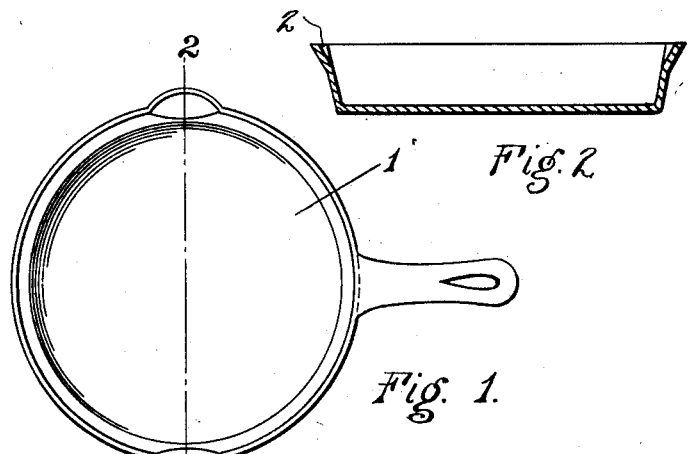
Fig. 1.   Fig. 2.
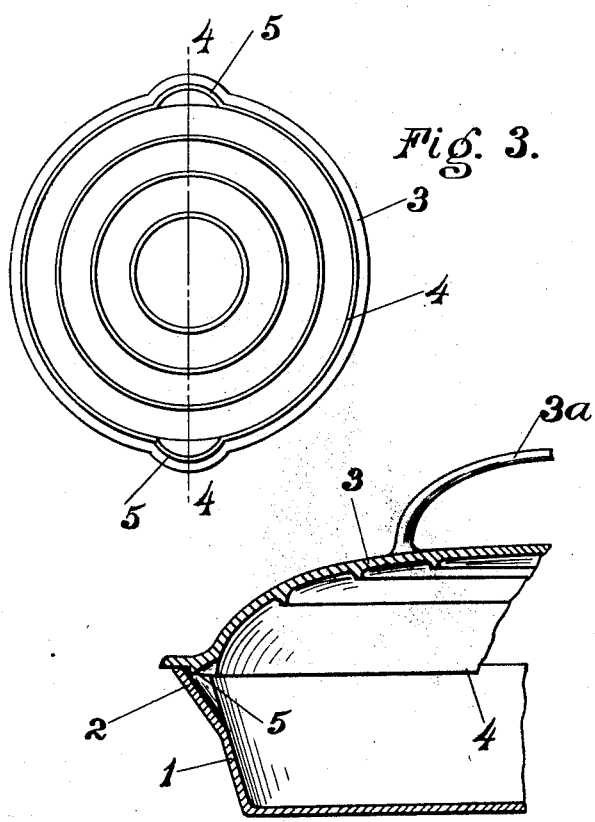
Fig. 3.
Fig. 5.
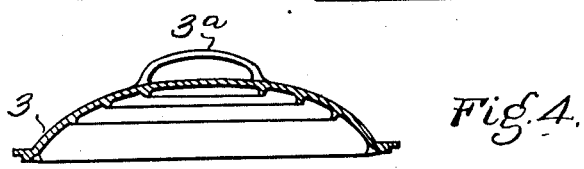
Fig. 4.
Inventor
Charles A. Massing
By
Attorney Patented Sept. 22, 1925.

1,554,360

UNITED STATES PATENT OFFICE.

CHARLES A. MASSING, OF MILLCREEK TOWNSHIP, ERIE COUNTY, PENNSYLVANIA, ASSIGNOR TO THE GRISWOLD MANUFACTURING COMPANY, OF ERIE, PENNSYLVANIA, A CORPORATION OF PENNSYLVANIA.

SKILLET.

Application filed February 16, 1925. Serial No. 9,445.

*To all whom it may concern:*

Be it known that I, CHARLES A. MASSING, a citizen of the United States, residing in Millcreek Township, in the county of Erie and State of Pennsylvania, have invented new and useful Improvements in Skillets, of which the following is a specification.

This invention is designed to provide a skillet with a cover so that the skillet may have added utility and where such cover is provided it is desirable to retain as far as possible the vapors formed within the skillet. These ordinarily form a slight pressure sufficient to lift the cover slightly where the cover makes a fair fit and where the vapors are discharged the condensate on the cover is discharged at the point of the discharge of the vapors. The present invention is designed to retain the vapors as much as possible both as a vapor and the condensate. This is accomplished by providing the cover with a surrounding rib which follows down along the inner surface of the wall of the skillet so as to make a more effective joint and this rib is deflected outwardly at the lip of the skillet so as to prevent the escape of vapors and with them the condensate at this point. The deflection of the rib in this way necessitates the placing of the cover in the position to bring the deflection at the lip. By forming two lips in the skillet not only is the additional convenience so far as the skillet is concerned provided but the cover may be more readily put in place because in no instance is it necessary to turn the cover more than a quarter turn to bring the deflected portions of the ribs into register with the lips and this turn can readily be made where the person has ahold of the handle without a new grip on the handle.

The invention is illustrated in the accompanying drawings as follows:—

Fig. 1 shows a plan view of the skillet, the cover being removed.

Fig. 2 a central section on the line 2—2 in Fig. 1.

Fig. 3 a bottom view of the cover.

Fig. 4 a section on the line 4—4 in Fig. 3.

Fig. 5 an enlarged section of the assembled cover and skillet on the lines 2—2 and 4—4 in Figs. 1 and 3.

1 marks the skillet. This is provided with the pouring lips 2. A cover 3 is arched and provided with a handle 3ª and with a surrounding rib 4 which extends downwardly into the skillet along the inner surface of the wall of the skillet. The condensate from the cover collects and drops off this rib and the rib forms an additional and better joint to prevent the escape of the vapors and also to prevent the carrying out of the condensate with any vapors when the cover is lifted. The rib is deflected outwardly at 5 to follow the contour of the lip and these deflections operate at opposite sides of the cover so that the cover may be brought to register with the lips at opposite sides of the skillet with not to exceed a quarter turn of the cover.

It will be noted that the cover is imperforate, and that the outer edge of the cover rests on the top of the edge of the skillet with the rib extending downwardly therein.

What I claim as new is:—

1. The combination of a skillet having a pouring lip; and an imperforate cover overlapping the top edge of the skillet throughout its circumference having a surrounding rib extending downwardly along the inner surface of the wall of the skillet, said rib being deflected outwardly at the lip to follow the contour of the lip.

2. The combination of a skillet having a plurality of pouring lips equally spaced; and an imperforate cover overlapping the top edge of the skillet throughout its circumference having a surrounding rib extending downwardly along the inner surface of the wall of the skillet, said rib being deflected outwardly at the lips to follow the contour of the lips.

In testimony whereof I have hereunto set my hand.

CHARLES A. MASSING.